United States Patent
Lee et al.

(10) Patent No.: US 9,380,456 B1
(45) Date of Patent: Jun. 28, 2016

(54) SYSTEM, METHOD AND COMPUTER PROGRAM PRODUCT FOR DYNAMICALLY SWITCHING OPERATING SYSTEMS IN A VIRTUAL MOBILE DEVICE PLATFORM

(71) Applicant: DroidCloud, Inc., Austin, TX (US)

(72) Inventors: Robert D. Lee, Austin, TX (US); Justin P. Marston, Austin, TX (US)

(73) Assignee: Hypori, Inc., Austin, TX (US)

( * ) Notice: Subject to any disclaimer, the term of this patent is extended or adjusted under 35 U.S.C. 154(b) by 313 days.

(21) Appl. No.: 14/161,069

(22) Filed: Jan. 22, 2014

Related U.S. Application Data

(60) Provisional application No. 61/755,205, filed on Jan. 22, 2013.

(51) Int. Cl.
*H04W 36/00* (2009.01)
*H04W 8/24* (2009.01)
*H04W 12/08* (2009.01)

(52) U.S. Cl.
CPC .............. *H04W 8/245* (2013.01); *H04W 12/08* (2013.01)

(58) Field of Classification Search
CPC .............. H04W 36/001; H04W 4/005; H04W 28/0226; H04W 36/00; H04W 36/0005; H04W 36/0022; H04W 36/0072; H04W 36/18; H04W 36/22; H04W 36/0083; H04W 36/0066; H04W 36/24; H04W 36/30; H04W 36/36; H04W 36/06; H04W 88/182; G06F 9/4862

See application file for complete search history.

(56) References Cited

U.S. PATENT DOCUMENTS

| | | | | |
|---|---|---|---|---|
| 6,845,238 | B1* | 1/2005 | Muller | H04W 36/18 455/436 |
| 7,190,356 | B2 | 3/2007 | Lin | |
| 7,400,328 | B1 | 7/2008 | Ye et al. | |
| 7,768,959 | B1* | 8/2010 | Chen | G06F 9/455 370/328 |
| 7,809,667 | B1 | 10/2010 | Yehuda et al. | |
| 7,827,228 | B2 | 11/2010 | Emberton | |
| 9,060,239 | B1 | 6/2015 | Sinha et al. | |
| 9,245,241 | B2 | 1/2016 | Kite | |
| 2003/0182383 | A1 | 9/2003 | He | |
| 2005/0088992 | A1* | 4/2005 | Bolin | H04W 88/085 370/329 |
| 2006/0203916 | A1 | 9/2006 | Chandramouly et al. | |
| 2006/0288306 | A1 | 12/2006 | Mahajan et al. | |
| 2007/0117561 | A1* | 5/2007 | Shu | H04W 8/26 455/428 |
| 2008/0225010 | A1 | 9/2008 | Wang | |
| 2009/0023426 | A1* | 1/2009 | Shatzkamer | H04M 3/42246 455/414.1 |
| 2009/0170472 | A1* | 7/2009 | Chapin | H04W 28/18 455/410 |

(Continued)

OTHER PUBLICATIONS

Office Action for U.S. Appl. No. 14/062,343, mailed May 26, 2015, 16 pgs.

(Continued)

*Primary Examiner* — Meless Zewdu
(74) *Attorney, Agent, or Firm* — Sprinkle IP Law Group

(57) ABSTRACT

Embodiments disclosed herein provide a system, method, and computer program product for dynamically switching virtual devices in a virtual mobile device platform. The virtual devices may use any desired operating system or operating system version. In some embodiments, a launch application installed on a secondary virtual device is defined for opening a file of a given file type. Upon a request to open a file of the given file type, the secondary virtual device is launched, and a connection is established with a client device. A client device can connect to a secondary virtual device by using a primary virtual device as a proxy, or by using a bypass channel connection.

20 Claims, 12 Drawing Sheets

(56) References Cited

U.S. PATENT DOCUMENTS

| | | |
|---|---|---|
| 2009/0207140 A1 | 8/2009 | Hansson |
| 2010/0069035 A1 | 3/2010 | Johnson |
| 2010/0100725 A1 | 4/2010 | Ozzie |
| 2010/0103837 A1 | 4/2010 | Jungck |
| 2010/0115020 A1 | 5/2010 | Hochmuth et al. |
| 2010/0173605 A1 | 7/2010 | Moraes |
| 2010/0189887 A1 | 7/2010 | Nielsen |
| 2010/0238837 A1* | 9/2010 | Zheng ............ H04L 12/2876 370/254 |
| 2010/0306249 A1 | 12/2010 | Hill |
| 2010/0306771 A1 | 12/2010 | Kamay et al. |
| 2011/0102299 A1 | 5/2011 | Hochmuth et al. |
| 2011/0130951 A1 | 6/2011 | Lee |
| 2011/0176528 A1* | 7/2011 | Lu .................... H04W 84/00 370/338 |
| 2011/0210972 A1 | 9/2011 | Tsirkin et al. |
| 2011/0213828 A1 | 9/2011 | Tsirkin et al. |
| 2011/0223918 A1* | 9/2011 | Dahlen ............... H04W 24/00 455/436 |
| 2011/0270600 A1 | 11/2011 | Bose |
| 2011/0271200 A1 | 11/2011 | Kikkawa et al. |
| 2012/0064908 A1 | 3/2012 | Fox et al. |
| 2012/0066304 A1 | 3/2012 | Marmon et al. |
| 2012/0130042 A1 | 5/2012 | Brunelle et al. |
| 2012/0182970 A1* | 7/2012 | Ding ................... H04W 36/14 370/331 |
| 2012/0191657 A1 | 7/2012 | Weinstein et al. |
| 2012/0296963 A1* | 11/2012 | Lu ..................... H04W 84/00 709/203 |
| 2012/0310894 A1 | 12/2012 | Freedman et al. |
| 2012/0323690 A1 | 12/2012 | Michael |
| 2013/0024778 A1 | 1/2013 | Reeves et al. |
| 2013/0031482 A1 | 1/2013 | Saul |
| 2013/0078994 A1 | 3/2013 | Jouin |
| 2013/0083960 A1 | 4/2013 | Kostrzewski et al. |
| 2013/0086202 A1* | 4/2013 | Connelly ............. H04L 67/10 709/217 |
| 2013/0173556 A1 | 7/2013 | Grigg et al. |
| 2013/0188608 A1* | 7/2013 | Balachandran ....... H04W 36/30 370/335 |
| 2013/0265450 A1 | 10/2013 | Barnes, Jr. |
| 2013/0275766 A1 | 10/2013 | Plainecassagne et al. |
| 2013/0283038 A1 | 10/2013 | Kulkarni et al. |
| 2013/0326072 A1* | 12/2013 | Smyth ............... H04L 67/141 709/227 |
| 2013/0339185 A1 | 12/2013 | Johnson |
| 2013/0339498 A1 | 12/2013 | Johnson |
| 2014/0059160 A1* | 2/2014 | Chernoff ............. H04L 49/70 709/217 |
| 2014/0071895 A1 | 3/2014 | Bane et al. |
| 2014/0108084 A1 | 4/2014 | Bargetzi |
| 2014/0108940 A1 | 4/2014 | Diercks |
| 2014/0111528 A1 | 4/2014 | Lifshitz et al. |
| 2014/0358670 A1 | 12/2014 | Lefevre |
| 2015/0050915 A1 | 2/2015 | Formo |
| 2015/0082456 A1 | 3/2015 | Eren et al. |
| 2015/0089395 A1 | 3/2015 | Beel et al. |
| 2015/0091947 A1 | 4/2015 | Rakow et al. |
| 2015/0222604 A1 | 8/2015 | Ylonen |

OTHER PUBLICATIONS

Office Action for U.S. Appl. No. 14/161,083, mailed Feb. 3, 2016, 27 pgs.

Office Action for U.S. Appl. No. 14/161,157, mailed Feb. 22, 2016, 15 pgs.

Office Action for U.S. Appl. No. 14/160,794, mailed Sep. 1, 2015, 12 pgs.

Notice of Allowance for U.S. Appl. No. 14/160,904, mailed Mar. 8, 2016, 6 pgs.

Office Action for U.S. Appl. No. 14/160,794, mailed Mar. 9, 2016, 11 pgs.

Office Action for U.S. Appl. No. 14/160,946, mailed Mar. 9, 2016, 20 pgs.

Notice of Allowance for U.S. Appl. No. 14/160,877, mailed Apr. 7, 2016, 9 pgs.

* cited by examiner

SYSTEM, METHOD AND COMPUTER PROGRAM PRODUCT FOR DYNAMICALLY SWITCHING OPERATING SYSTEMS IN A VIRTUAL MOBILE DEVICE PLATFORM

CROSS-REFERENCE TO RELATED APPLICATIONS

This application is a conversion of and claims a benefit of priority from U.S. Provisional Application No. 61/755,205, filed Jan. 22, 2013, entitled "VIRTUAL MOBILE DEVICE PLATFORM." This application relates to U.S. patent application Ser. No. 14/160,794, filed Jan. 22, 2014, entitled "SYSTEM, METHOD AND COMPUTER PROGRAM PRODUCT FOR CAPTURING TOUCH EVENTS FOR A VIRTUAL MOBILE DEVICE PLATFORM"; Ser. No. 14/160,877, filed Jan. 22, 2014, entitled "SYSTEM, METHOD AND COMPUTER PROGRAM PRODUCT FOR PROVIDING NOTIFICATIONS FROM A VIRTUAL DEVICE TO A DISCONNECTED PHYSICAL DEVICE"; Ser. No. 14/160,904, filed Jan. 22, 2014, entitled "SYSTEM, METHOD AND COMPUTER PROGRAM PRODUCT FOR CONNECTING ROAMING MOBILE DEVICES TO A VIRTUAL DEVICE PLATFORM"; Ser. No. 14/160,946, filed Jan. 22, 2014, entitled "SYSTEM, METHOD AND COMPUTER PROGRAM PRODUCT PROVIDING BYPASS MECHANISMS FOR A VIRTUAL MOBILE DEVICE PLATFORM"; Ser. No. 14/161,083, filed Jan. 22, 2014, entitled "SYSTEM, METHOD AND COMPUTER PROGRAM PRODUCT FOR USER PERFORMANCE AND DEVICE RESOLUTION SETTINGS"; and Ser. No. 14/161,157, filed Jan. 22, 2014, entitled "SYSTEM, METHOD AND COMPUTER PROGRAM PRODUCT FOR GENERATING REMOTE VIEWS IN A VIRTUAL MOBILE DEVICE PLATFORM." All applications listed in this paragraph are incorporated by reference as if set forth herein in their entireties.

TECHNICAL FIELD

This disclosure relates generally to a virtual mobile device platform for touch-enabled mobile devices. More particularly, embodiments disclosed herein relate to a system, method, and computer program product for dynamically switching operating systems in a virtual mobile device platform.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY OF THE DISCLOSURE

Embodiments disclosed herein provide a system, method, and computer program product for dynamically switching operating systems in a virtual mobile device platform. In some embodiments, a launch application is defined for opening a file of a given file type. The launch application may be installed on a secondary virtual device or running as part of a client application. Upon a request to open a file of the given file type, the secondary virtual device is launched, and a connection is established with a client device.

Embodiments disclosed herein can provide many advantages. For example, in some embodiments, seamlessly and dynamically switching between multiple operating systems improves user experience and/or security by allowing the user to use the most appropriate operating system and application for a given task.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
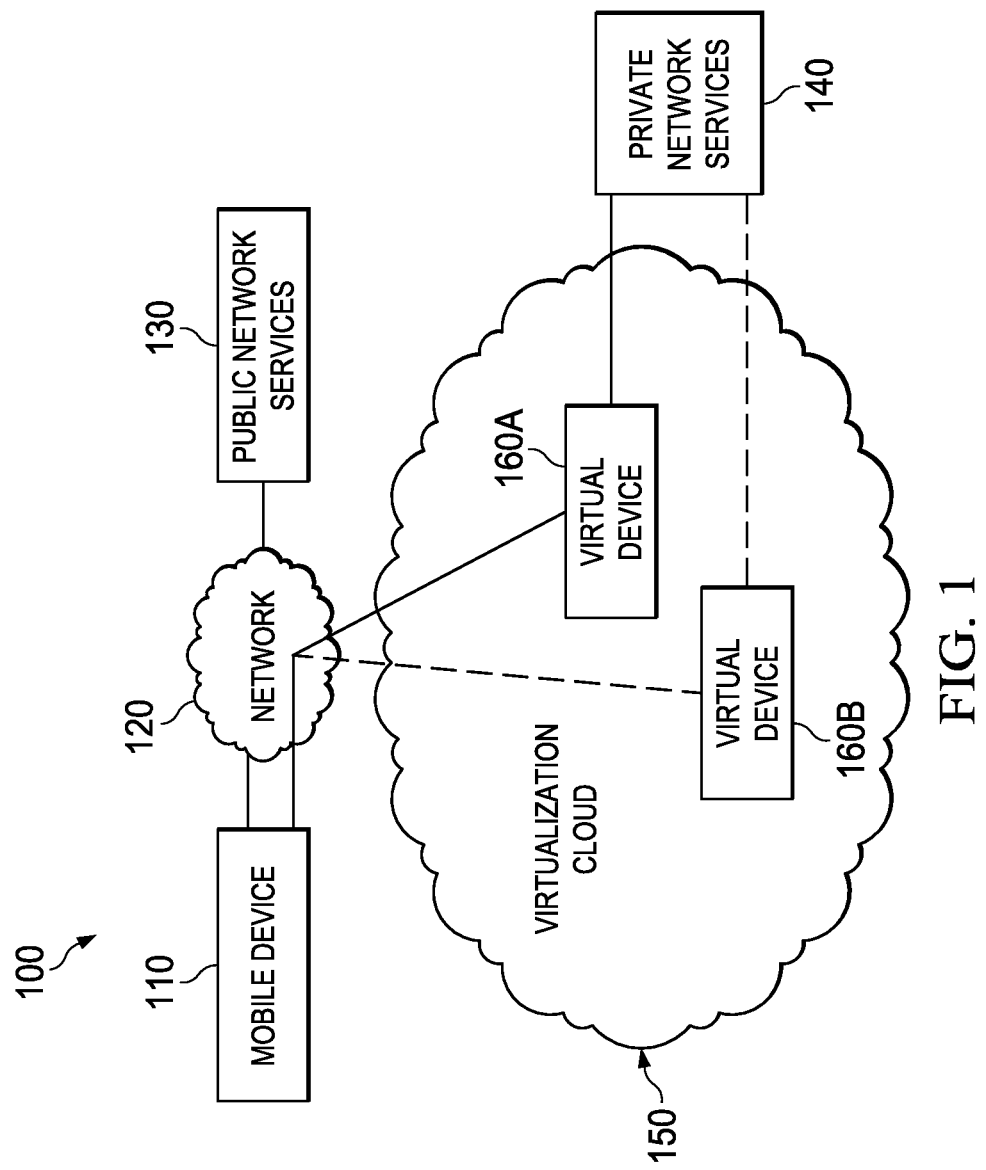
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
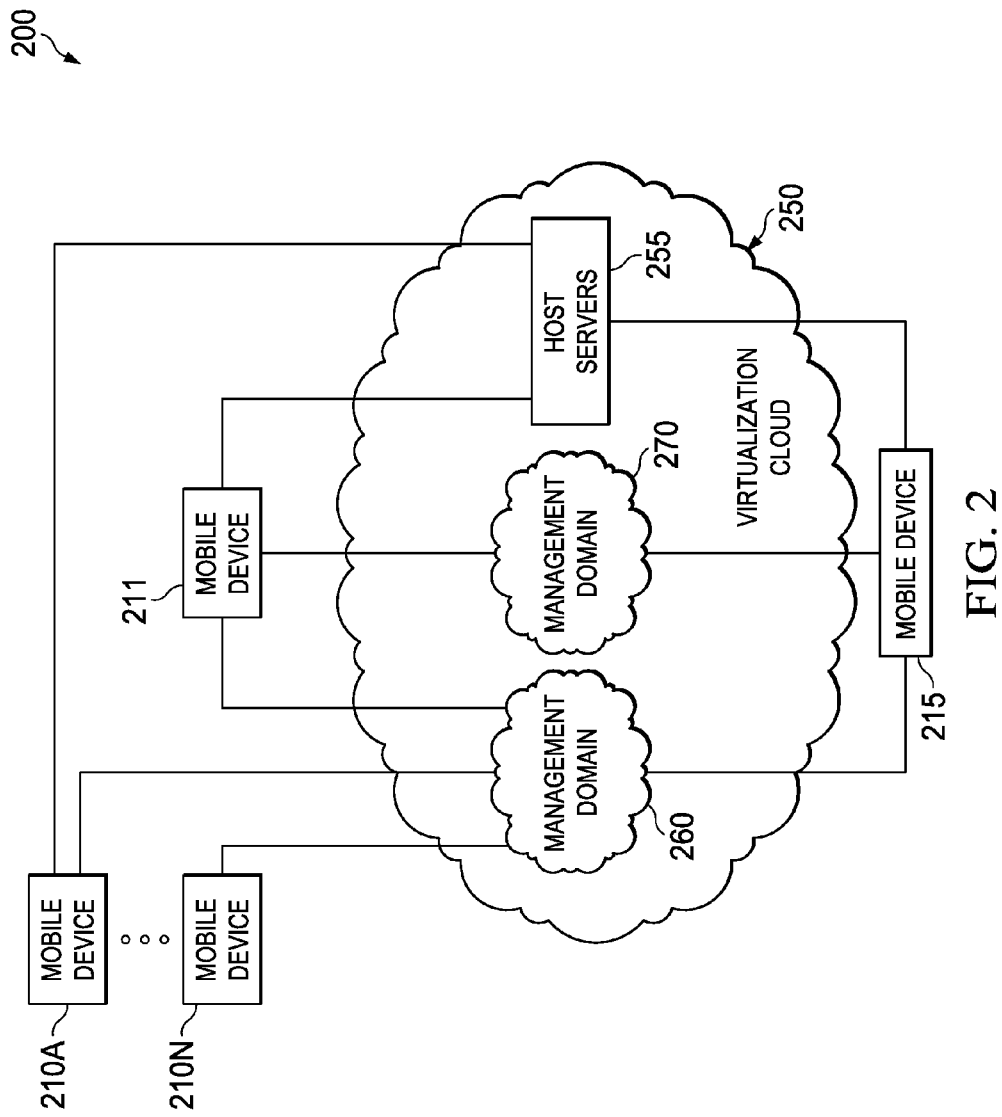
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A ... 210N, 211, and 215. Mobile devices 210A ... 210N, 211, and 215 may represent different types of actual touchscreen devices such as smartphones and tablets. Mobile devices 210A ... 210N, 211, and 215 may be owned by the same or different entities (e.g., enterprises, users, etc.). Further, mobile devices 210A ... 210N, 211, and 215 may be programmed with different operating systems such as iOS, Android, and Windows.

Each of mobile devices 210A ... 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
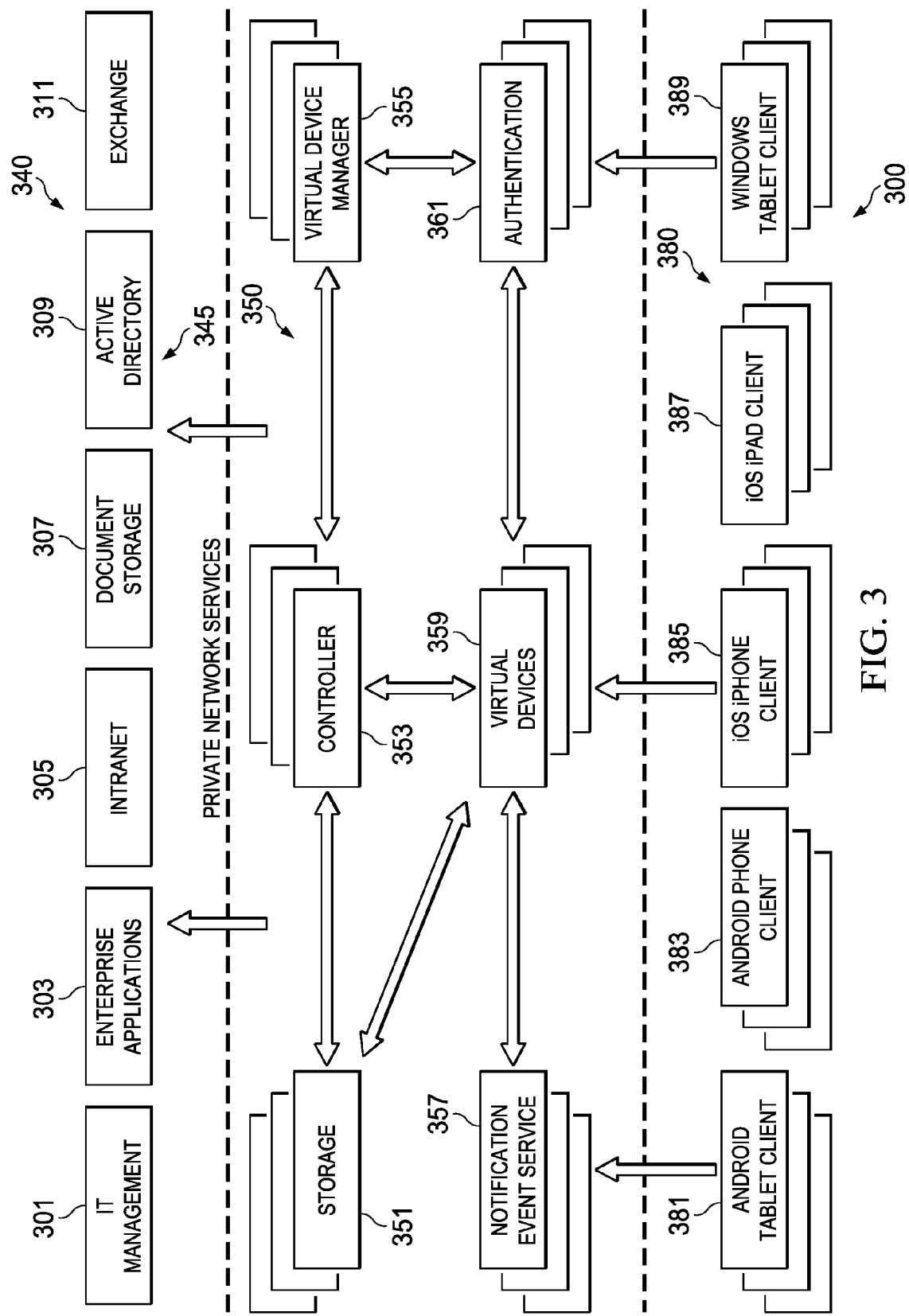
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A ... 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
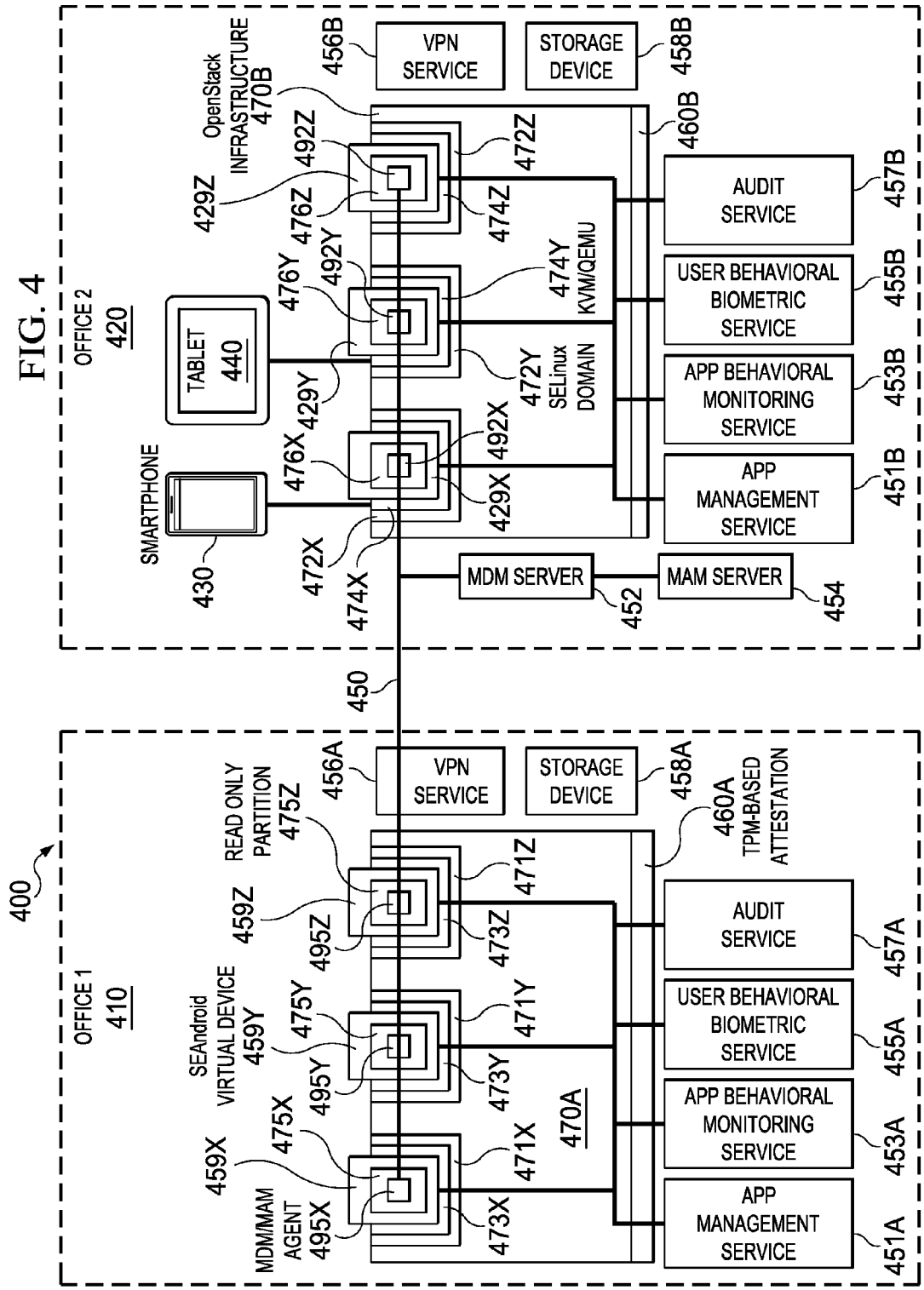
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using Open-Stack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
Scheduling specific times for upgrades to occur.
Roll back to a previous device template if an error occurs.
Partial, incremental upgrade processes across a user population.
Detection of whether a user is active on a virtual device before enacting the upgrade.
Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization. A detailed example is provided below, with respect to FIG. 8E.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
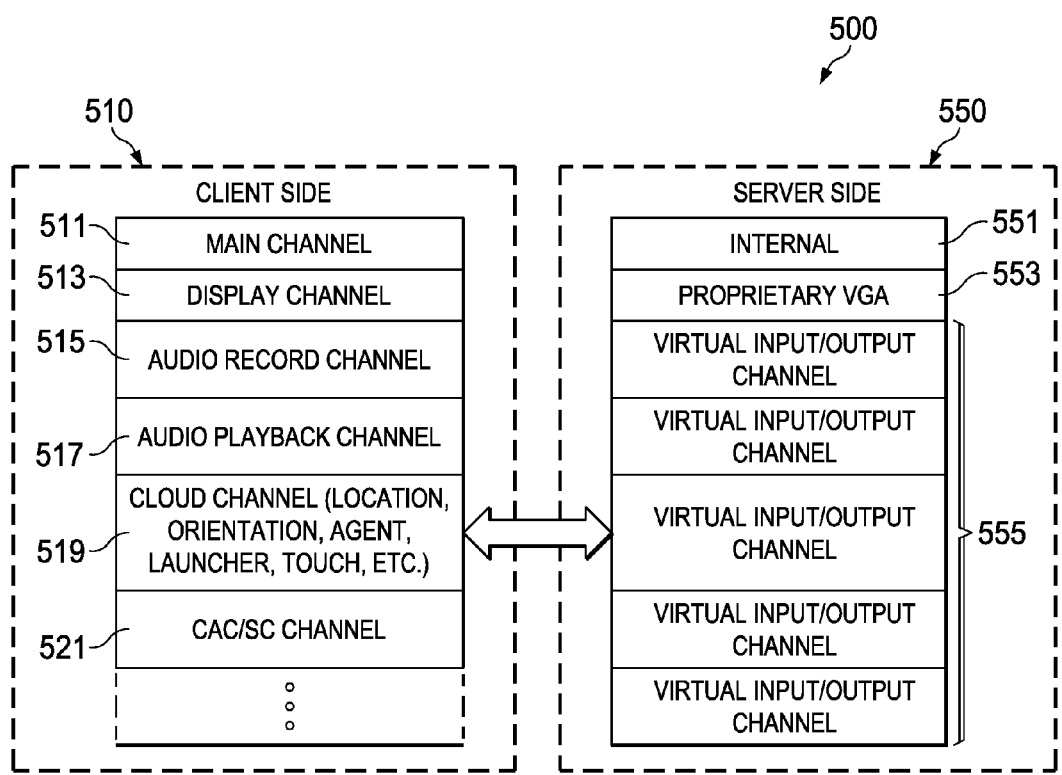
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
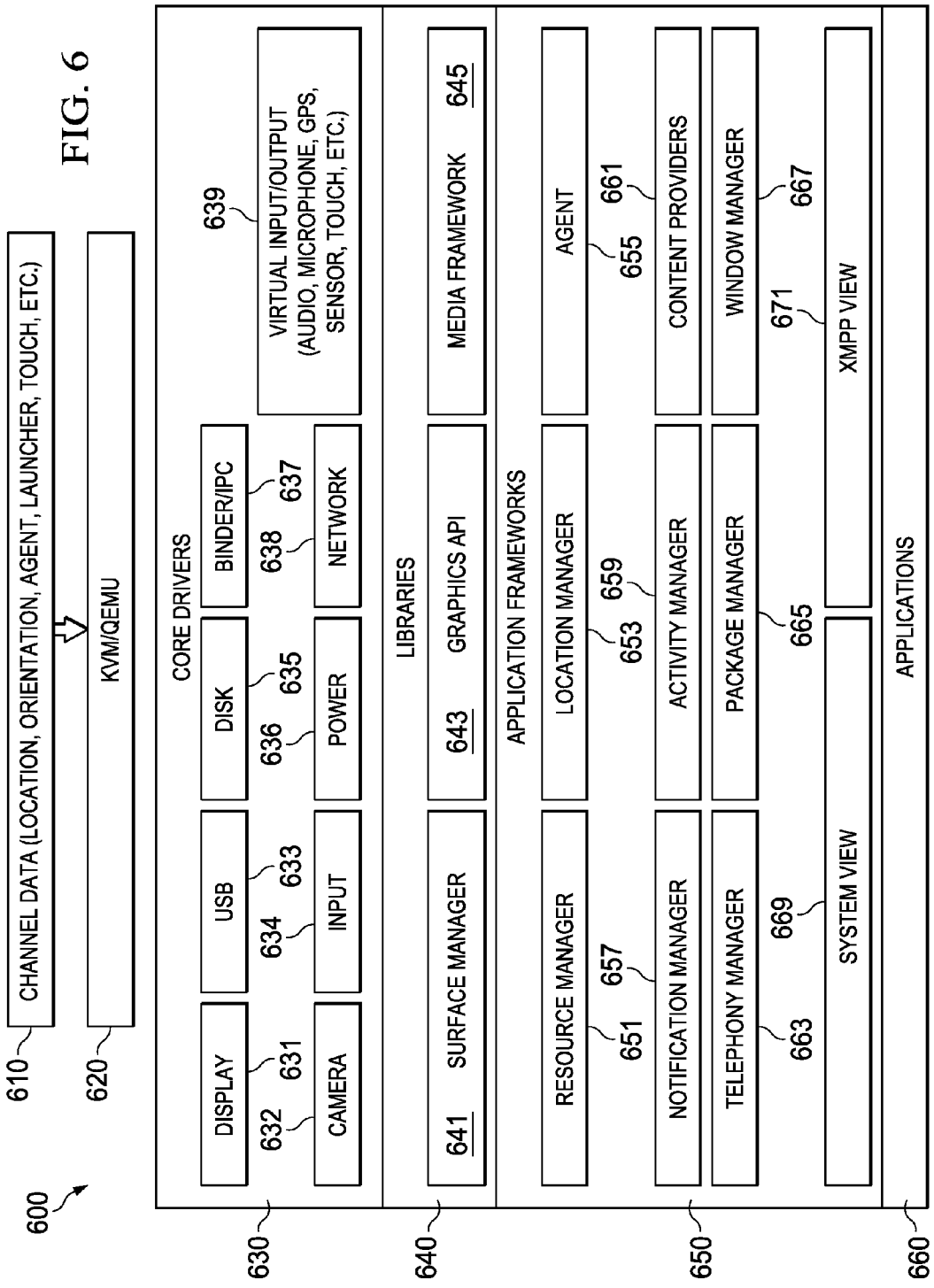
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's WiFi or data network. Instead, they use the Internet Protocol (IP)-based network services provided by the virtual device servers. In some embodiments, an "always-on" network interface may be provided to the applications. WiFi and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, WiFi signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

There are currently hundreds of thousands of apps available for Android, but there will continue to be some apps that are either not supported on Android or have inferior user experiences to those on other operating system platforms. An example is Microsoft (MS) Office. MS Office is currently only available for Windows 8, and while an Android version of MS Office may be released in the future, it is likely to still be functionally inferior to the Microsoft's implementation of MS Office on its own flagship operating system—Microsoft Windows.

The embodiments described below are capable of giving users the 'best of both worlds', by enabling dynamic OS switching. Generally, dynamic OS switching allows a user of a mobile device to seamlessly and dynamically switch between multiple operating systems to improve the user experience and/or enhance security. With dynamic OS switching enabled, various events can trigger a switch to an alternative OS. For example, each file type in a virtual device can be correlated to a 'launch app' (the default app to open a given file type), and these launch paths can be local to the user's primary virtual device or separate from it. The launch application may be installed on a secondary virtual device or running as part of a client application in the case of a bypass launcher. These are further explained below. For examples of bypass mechanisms that may be employed to implement a bypass launcher, readers are directed to the above-referenced U.S. patent application Ser. No. 14/160,946, filed Jan. 22, 2014, entitled "SYSTEM, METHOD AND COMPUTER PROGRAM PRODUCT PROVIDING BYPASS MECHANISMS FOR A VIRTUAL MOBILE DEVICE PLATFORM," which is incorporated herein by reference. With a bypass launcher, some apps would take the client to the Android VM, others to the Windows VM, and the user would be able to switch between them using the 'recent apps' list accessed from the Android popup bar. In one embodiment, the Android bottom button bar could also be overlaid over the Win8 display, to provide consistent navigation options.

The Android OS may provide multiple options to load a given file type (e.g., when there are multiple viewers available, such as Adobe Acrobat and a third party PDF viewer). As explained below, embodiments can publish available file viewers from one OS into the selection list of the other. As one example, opening a Microsoft Word file can cause the Word file to load in a Windows 8 virtual device, which can itself be constrained in a kiosk, if desired. A system implementing an embodiment disclosed herein may publish .DOC viewers from the Win8 VM into the Android VM, and these viewers are listed alongside the native Android .DOC viewers.

The net result of this feature is dynamic OS switching. Dynamic OS switching enables selecting the most appropriate remote OS and/or most appropriate application based on administrator's and/or user's preferences, workflow context, security policies, hardware requirements, licensing restrictions, etc.

Note that this mechanism can also support different versions of builds of a given operating system such as Android, as well as switching between different operating system types. For example, there are scenarios in which an app may only run on a previous version of Android and have not been updated and tested on the latest version of Android.

A further use case is to allow 'untrusted' apps to run in a separate virtual device container, effectively in kiosk mode, either on the same or different operating system as the primary virtual device. This allows administrators to permit use of apps that have been subject to less stringent vetting processes than those applied to the core set of apps, without putting core enterprise data at significant risk (if the untrusted app turns out to be malware). Similarly, it may sometimes be desirable for 'trusted' apps to run in a separate virtual device container. For example, there may be situations where administrators do not want data shared between apps, or copied and pasted into other apps. In these situations, administrators can require that these apps run in a separate virtual device container.

One concern when implementing a dynamic OS switching system on virtual mobile device platform relates to network latency. When providing remote access to multiple operating systems, network latencies can increase, as data is passed through more components and typically over longer distances. Also, if one virtual device is acting as a proxy for another, data may be encoded and re-encoded multiple times. Following are descriptions of various exemplary embodiments for providing dynamically switching operating systems in a virtual mobile device platform. Of course, other embodiments are also possible, as one skilled in the art would understand.

In one embodiment, a user of a mobile device client establishes a connection to a primary virtual mobile device. When the need arises (examples of triggers are provided below) a secondary virtual device is started. The secondary virtual device may be based on the same OS (the same or a different version) as the first virtual device, or a different OS. A connection is made between the primary virtual device and the secondary virtual device and a series of handshaking steps take place to facilitate a session handover from the primary virtual device to the secondary virtual device, including passing any needed context information to the secondary virtual device. Note that, in some examples, a user may simultaneously use both virtual devices. For example, a user may be using MS Word on a secondary Windows based OS virtual device, while listening to audio from the primary virtual device. Once the handshaking has taken place, the user of the client device is able to view and use the secondary virtual device. In some examples, the user may not even be aware that the user is using a different virtual device. Data from the secondary virtual device can be passed to the client mobile device in any desired manner, including examples described below. Once the need for the secondary device ends, the secondary virtual device can be shut down, and the user will go back to using only the primary virtual device. In this case, data from the secondary virtual device can be returned to the primary virtual device, noting application context. As an example, the Word document attached to the email being composed in the email client in the primary virtual device is updated with the changes the user created to that Word document in the secondary virtual device.

As mentioned above, a secondary virtual device can be triggered in any desired manner. When opening certain file types, it may be desirable to open the files in certain apps that may only be available in certain operation systems, or may be easier to use in certain operating systems. For example, when editing or viewing an MS Office file (e.g., Word, PowerPoint, etc.), it may be desirable to edit or view the file in MS Office in a Windows environment. In one embodiment, certain file types are registered in the primary OS or on the client device to be opened by the desired application, in the desired operating system. For example, assume that it is desired to open PowerPoint files in MS Office in a Windows environment. In one example, when a user selects a PowerPoint file, the Windows OS virtual device is automatically launched. In another example, a sub-menu can be displayed, giving the user the option of opening the PowerPoint file in MS Windows, Android, etc. Based on the user's selection, the appropriate virtual device is launched, if needed.

Besides OS switching triggers based on file types, other events can also trigger a secondary virtual device. When an administrator or user wants certain applications to run on a certain operating system, a secondary virtual device can be launched when the user launches the application on the client mobile device. For example, for security reasons, it may be desirable to run certain applications in a separate, isolated virtual container.

Figure 7:
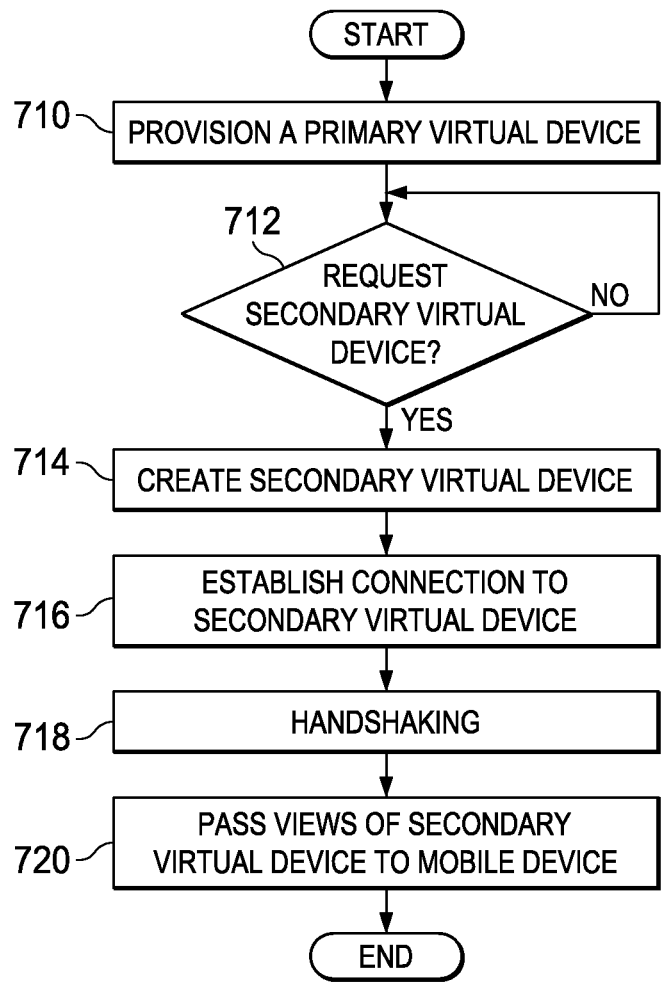
FIG. 7 depicts a flowchart of a process for dynamically switching operating systems according to one embodiment.

FIG. 7 depicts a flowchart of a process for dynamically switching between multiple virtual devices, each of which may use the same or different operating systems. At step 710, a user of a mobile device launches a client application to start a primary virtual device, as is described in detail above. Once the primary virtual device is provisioned, the process waits for a request for a secondary virtual device (step 712). The request for a secondary virtual device can be triggered by various events, as described above. When a request for a secondary virtual device is triggered, a secondary virtual device is created (step 714). Once provisioned, a connection is established between the primary virtual device and the secondary virtual device (step 716) and a series of handshaking takes place (step 718), to facilitate the viewing and control of the secondary virtual device by the client mobile device. After the handshaking, screen views of the secondary virtual device are passed to the client device (step 720). In addition, as with the primary virtual device, secondary virtual device is allowed access to the client mobile device's physical interlaces (e.g., soft and hard keyboards, touchscreen, GPS, camera, accelerometer, speakers, microphone, phone dialer, etc.).

The connection between the client device and the secondary virtual device can be accomplished in a number of ways, as described below with respect to FIGS. 8A-8E. Once the task that triggered the secondary virtual device is finished, or upon instruction from a user, the connection to the secondary virtual device is terminated, and the secondary virtual device is shut down. In some embodiments, the secondary virtual device can continue to run in the background to allow faster future access. Similarly, when a secondary virtual device is shut down, its state can be saved, if desired.

Figure 8A:
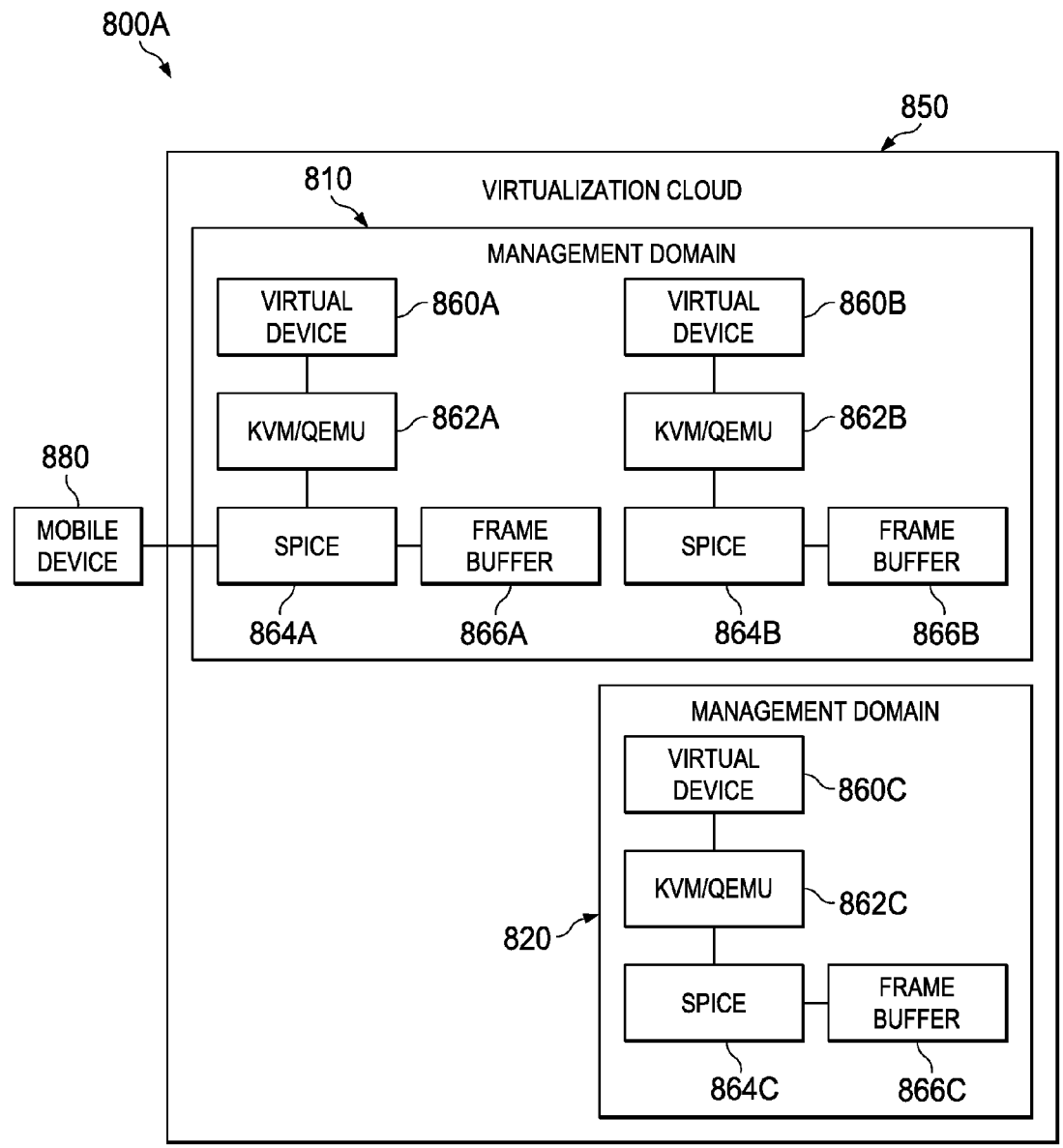
FIG. 8A depicts a diagrammatic representation of an example of virtualization server software architecture according to one embodiment that enables dynamic operating system switching.

A system for performing the process depicted in FIG. 7 can be implemented in any desired manner, including the following non-exclusive examples. FIG. 8A depicts a diagrammatic representation of an example of virtualization server software architecture according to one embodiment that enables dynamic operating system switching.

As illustrated in FIGS. 8A-8E, virtualization server software architecture (800A, 800B, 800C, 800D, 800E) may comprise a virtualization cloud 850, similar to the virtualization clouds described above. Virtualization cloud 850 provides a hosted, networked, application environment. As a non-limiting example, in one embodiment, virtualization cloud 850 is configured as an Android application environment. As illustrated in FIGS. 8A-8E, virtualization cloud 850 may comprise host servers (not shown) and management domains 810 and 820. In the examples shown, management domain 810 includes virtual devices 860A and 860B and management domain 820 includes virtual device 860C. For clarity, other components of the management domains 810 and 820 are not shown, such as storage, a virtual device manager, a notification event service, an authentication controller, etc. The components of each management domain 810 or 820 may run on a single server machine or separately on multiple server machines.

Each virtual device depicted in FIGS. 8A-8E is associated with several components. In the example depicted, the virtual devices communicate with mobile devices using the SPICE protocol (illustrated as SPICE 864A, 864B, 864C, 864C). Channel data is received into a virtual device's KVM/QEMU hypervisor (862A, 862B, 862C, 862D), mapped via virtual input/output channels, and handled by corresponding virtual device drivers (not shown). In the example depicted in FIG. 8A, a mobile device 880 has established a connection with virtual device 860A in a manner described above with respect to FIGS. 1-6. FIG. 8A also shows a virtual frame buffer (866A, 866B, 866C) associated with each virtual device. In one example, the graphics layer of each virtual device can be instrumented to write to its respective frame buffer, which drives a virtual display. The frame buffer data is compressed in SPICE and sent to the mobile device over a display channel.

When a secondary virtual device is requested, for example to access a program available on another operating system, a secondary virtual device is created, such as virtual device 860B in management domain 810 or virtual device 860C in management domain 820. The communication between the secondary virtual device 860B or 860C and the mobile device 880 can be handled in any desired manner. Several examples follow.

Figure 8B:
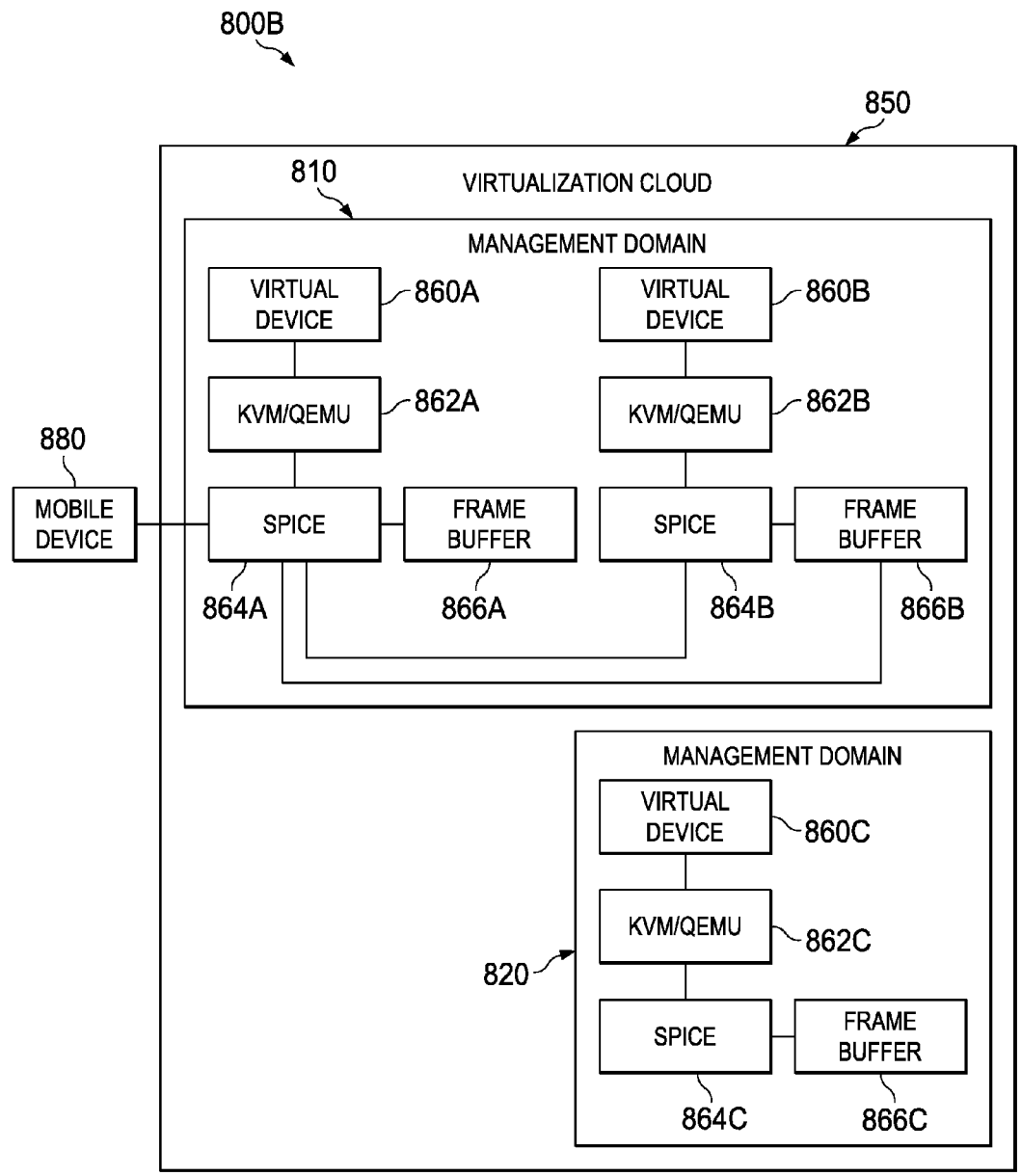
FIG. 8B depicts a diagrammatic representation of an example illustrating the communication between the mobile device and a secondary virtual device.

FIG. 8B depicts a first example illustrating the communication between the mobile device 880 and secondary virtual device 860B. In this example, the primary virtual device 860A, through a series of handshakes, establishes a connection with the secondary virtual device 860B to facilitate access to the physical interfaces of the mobile device 880, as well as send video display information to the mobile device 880. In one example, the virtual device 860A receives data from the frame buffer 866B of the secondary virtual device 860B. In another example, where the primary and secondary virtual devices share at least some of the same hardware, the virtual frame buffers of secondary virtual devices are provided in shared memory, allowing the primary virtual device 860A to read secondary virtual device frame buffers without need to copy their contents.

In the example depicted in FIG. 8B, where virtual device 860A acts as a proxy for virtual device 860B, an improvement in performance can be realized by avoiding unnecessary encoding/decoding steps. For example, in a first implementation, data from virtual device 860B is received and decoded by virtual device 860A. The decoded data is then re-encoded for transmission to the mobile device 880. In another implementation, the decoding and encoding performed at the virtual device 680A is skipped, and the encoded data from the secondary virtual device 860B is simply relayed to the mobile device 880. This effectively bypasses the encoding/de-coding steps normally performed by the primary virtual device 860A, decreasing latency and complexity.

In the example depicted in FIG. 8B, doing two remoting steps (from secondary virtual device 860B to primary virtual device 860A and from primary virtual device 860A to mobile device 880) will add latency and complexity to the VC system. To avoid this, the VC client application on the mobile device 880 can connect to the secondary virtual device 860B servers via a bypass channel, and the session is handed over from primary virtual device 860A to the secondary virtual device 860B.

Figure 8C:
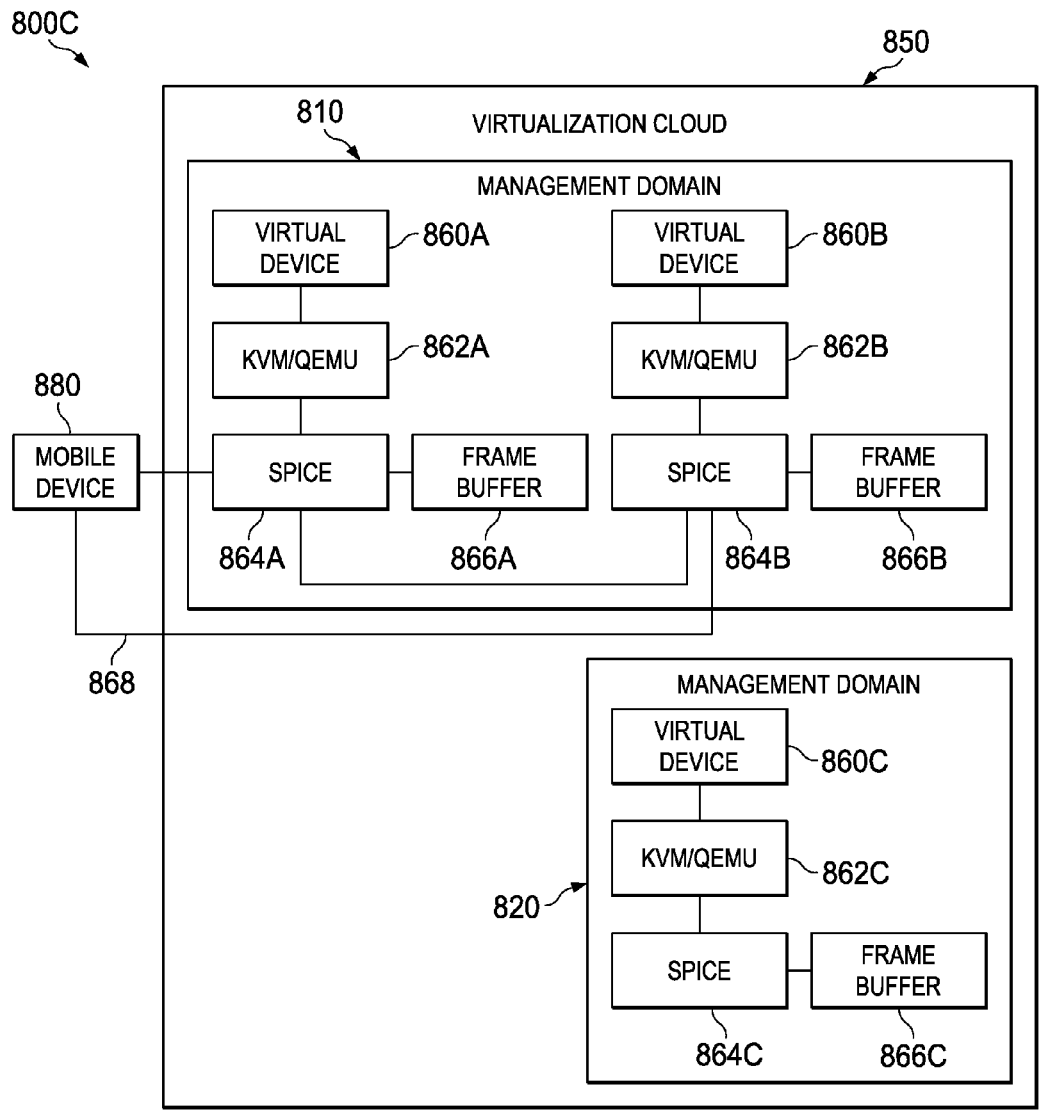
FIG. 8C depicts a diagrammatic representation of an example illustrating direct communication between the mobile device and a secondary virtual device.

FIG. 8C depicts an example illustrating the communication between the mobile device 880 and the secondary virtual device 860B via a bypass channel. In this example, the primary virtual device 860A, through a series of handshakes, establishes a connection with the secondary virtual device 860B to facilitate access to the physical interfaces of the mobile device 880, as well as send video display information to the mobile device 880.

In the example of FIG. 8C, the mobile device 880 can establish a separate, bypass channel connection 868 to secondary virtual device 860B. In one embodiment, the bypass channel connection 868 may be provided by creating a special SPICE channel. In one embodiment, the bypass channel connection 868 may be provided by creating a dedicated channel, as explained below. The bypass channel connection 868 effectively bypasses the virtual device 860A, reducing network latency by shortening and the data path. In some examples, the primary virtual device 860A monitors the bypass connection 868 for several reasons, such as tracking, recording, auditing, etc. Also note that, while the mobile device 880 has a direct bypass connection to secondary virtual device 860B, the mobile device 880 will still maintain the connection to the primary virtual device 860A, and may also run apps or use resources of both virtual devices simultaneously. For example, while running an application on the virtual device 860B, the mobile device may simultaneously play audio from an application running on the primary virtual device 860A.

A bypass channel can be established between a mobile device and a secondary virtual device in any desired manner. In one example, upon a trigger event such as opening a particular file type, the primary virtual device and the secondary virtual device communicate with each other and a series of handshaking takes place. This communication may include instructions, such as 'load this ppt file in program X', etc. The client application is instructed to open a bypass channel connection to the secondary virtual device. The primary virtual device may also pass contextual information to the secondary virtual device. If the secondary virtual device does not have access to desired data (e.g., a file, an email attachment, etc.), then the desired data is passed from the primary virtual device to the secondary virtual device. Upon completion of the task performed by the secondary virtual device, any desired data (e.g., an edited or created file, etc.) is passed back to the primary virtual device. In some examples, the primary and secondary virtual devices have access to shared storage, and some steps of passing data back and forth may not be necessary.

In addition to being hosted on the same or different servers, a secondary virtual device can be hosted on the same (e.g., virtual device 860B) or on a different management domain (e.g., virtual device 860C). The virtual device 860C on management domain 820 may be hosted on the same or different hardware as the virtual device 860A. The management domain 820 may also be under the control of the same or different enterprise or organization as the management domain 810.

Figure 8D:
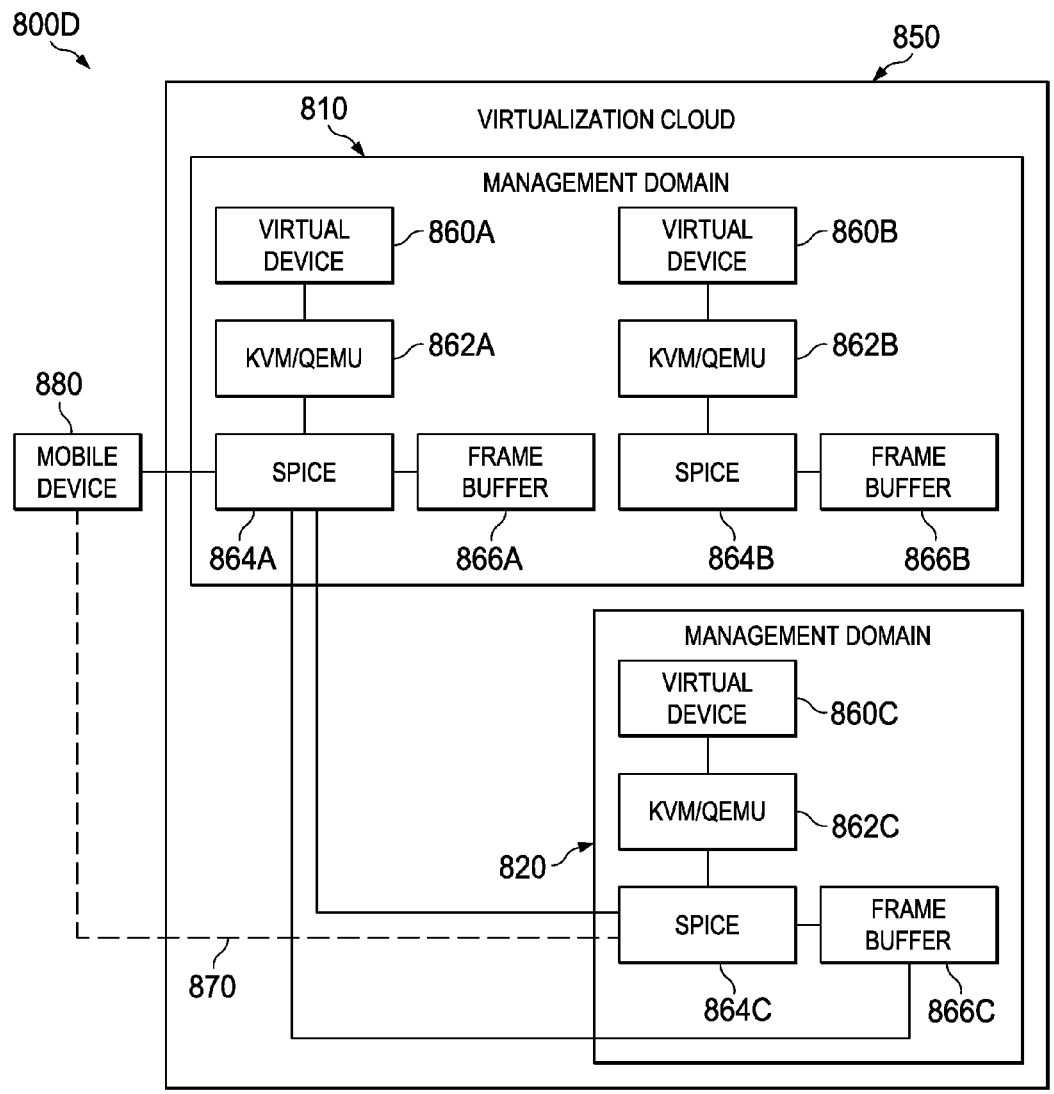
FIG. 8D depicts a diagrammatic representation of an example illustrating the communication between the mobile device and a secondary virtual device on a separate management domain.

FIG. 8D depicts an example illustrating the communication between the mobile device 880 and the secondary virtual device 860C on management domain 820. FIG. 8D depicts a first example illustrating the communication between the mobile device and secondary virtual device 860C, through primary virtual device 860A, similar to that shown in FIG. 8B. In this example, the primary virtual device 860A, through a series of handshakes, establishes a connection with the secondary virtual device 860C to facilitate access to the physical interfaces of the mobile device 880, as well as send video display information to the mobile device 880. In one example, the virtual device 860A receives data from the frame buffer 866C of the secondary virtual device 860C.

As mentioned above, doing two remoting steps (in this case, from secondary virtual device 860C to primary virtual device 860A and from primary virtual device 860A to mobile device 880) will add latency and complexity to the VC system. FIG. 8D also depicts another example illustrating the communication between the mobile device 880 and the secondary virtual device 860C via a bypass channel connection. In this example, the mobile device 880 establishes a separate, bypass channel connection 870 (shown by dashed lines) to secondary virtual device 860C. The bypass connection 870 effectively bypasses the primary virtual device 860A, reducing network latency by shortening and the data path. In some examples, the primary virtual device 860A monitors the bypass connection 870 for several reasons, such as tracking, recording, auditing, etc. Also note that, while the mobile device 880 has a direct bypass connection to secondary virtual device 860C, the mobile device 880 will still maintain the connection to the primary virtual device 860A, and may be running apps or using resources of both virtual devices simultaneously.

In some embodiments, an organization or enterprise may wish to provision a virtual device (whether a full device, kiosk mode, published app, etc.) to a person not employed by that organization. For example, a user may typically use virtual devices in virtualization cloud 850, as described above. The user may also need to use a virtual device from another enterprise, such as a bank, for example. In that example, the user need only download a VC client application or add the account to their existing VC client application on their mobile device(s).

Figure 8E:
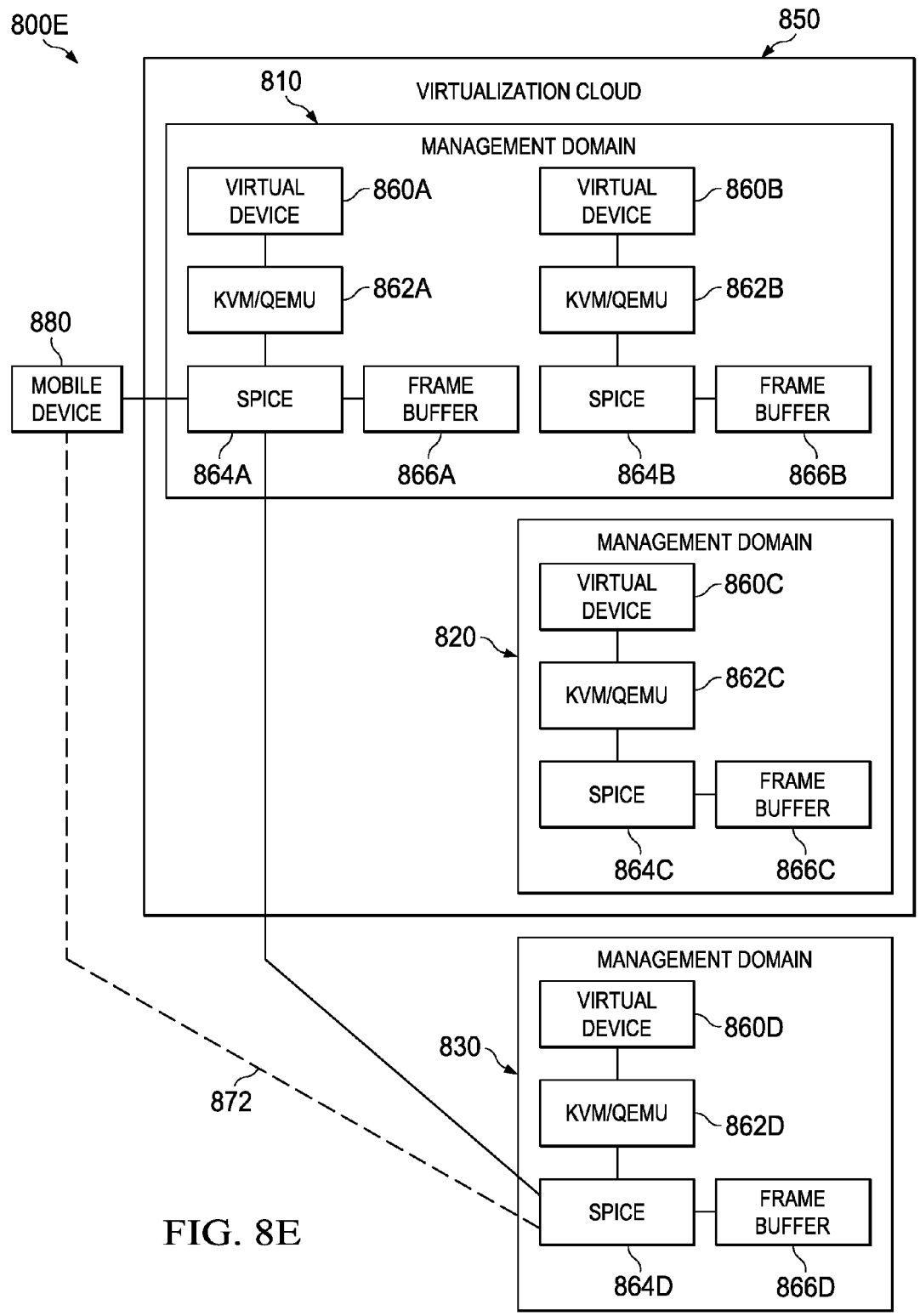
FIG. 8E depicts a diagrammatic representation of an example illustrating the communication between the mobile device and a secondary virtual device on a separate virtualization cloud.

FIG. 8E depicts an example illustrating the communication between the mobile device 880, the primary virtual device 860A, and a secondary virtual device 860D on management domain 830, which may belong to a different organization or enterprise from management domain 830. In a first example, the primary virtual device 860A, through a series of handshakes, establishes a connection with the secondary virtual device 860D to facilitate access to the physical interfaces of the mobile device 880, as well as send video display information to the mobile device 880. Since the management domain 830 is likely located remotely from management domain 810, the system may experience a significant amount of network latency. In addition, it is possible that the security policies at management domains 810 and 830 may prohibit data access from one another. Therefore, for performance and security reasons, a direct bypass connection may be desirable.

FIG. 8E also depicts an example illustrating a bypass channel communication between the mobile device 880 and the secondary virtual device 860D. In this example, the mobile device 880 establishes a separate, direct bypass channel connection 872 (shown by dashed lines) to virtual device 860D. The bypass channel connection 872 effectively bypasses the virtual device 860A, reducing network latency by shortening and the data path. In some examples, if allowed by the security policies of the management domain 830, the virtual device 860A monitors the bypass channel connection between the mobile device 880 and the secondary virtual device 860D for several reasons, such as tracking, recording, auditing, etc. Also note that, while the mobile device 880 has a direct bypass channel connection to secondary virtual device 860D, the mobile device 880 may still maintain the connection to the primary virtual device 860A, and may be running apps or using resources of both virtual devices simultaneously.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk. CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such product, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for dynamically switching virtual devices in a virtual mobile device platform, the method comprising:
   a mobile device establishing a first connection over a network to a primary virtual device running on the virtual mobile device platform;
   subsequent to a triggering event, establishing a second connection that connects the primary virtual device to a secondary virtual device;
   performing a session handover between the primary virtual device and the secondary virtual device over the second connection, the session handover including context information; and
   passing data from the secondary virtual device to the mobile device over the network.

2. The method according to claim 1, wherein the primary virtual device and the secondary virtual device have same operating system or different operating systems.

3. The method according to claim 1, further comprising:
   terminating the second connection to the secondary virtual device when a task associated with the triggering event is completed or per an instruction received from the mobile device.

4. The method according to claim 3, further comprising:
   prior to terminating the second connection to the secondary virtual device, passing data from the secondary virtual device to the primary virtual device.

5. The method according to claim 3, further comprising:
   subsequent to terminating the second connection to the secondary virtual device, shutting down the secondary virtual device or running the secondary virtual device in a background process.

6. The method according to claim 1, further comprising:
   providing a user of the mobile device with simultaneous or substantially simultaneous access to the primary virtual device and to the secondary virtual device.

7. The method according to claim 1, wherein the virtual mobile device platform is hosted in a cloud having multiple management domains and wherein the primary virtual device and the secondary virtual device are in same management domain or different management domains in the cloud.

8. A computer program product comprising at least one non-transitory computer readable medium storing instructions translatable by a virtual mobile device platform server machine to perform:
   establishing a first connection over a network between a mobile device and a first virtual device running on the virtual mobile device platform;
   subsequent to a triggering event, establishing a second connection between the first virtual device and a second virtual device;
   performing a session handover between the first virtual device and the second virtual device over the second connection, the session handover including context information; and
   passing data from the second virtual device to the mobile device over the network.

9. The computer program product of claim 8, wherein the first virtual device and the second virtual device have same operating system or different operating systems.

10. The computer program product of claim 8, wherein the at least one non-transitory computer readable medium stores further instructions translatable by the virtual mobile device platform server machine to perform:
    terminating the second connection between the first virtual device and the second virtual device when a task associated with the triggering event is completed or per an instruction received from the mobile device.

11. The computer program product of claim 10, wherein the at least one non-transitory computer readable medium stores further instructions translatable by the virtual mobile device platform server machine to perform:
    prior to terminating the second connection between the first virtual device and the second virtual device, passing data from the second virtual device to the first virtual device.

12. The computer program product of claim 10, wherein the at least one non-transitory computer readable medium stores further instructions translatable by the virtual mobile device platform server machine to perform:
    subsequent to terminating the second connection between the first virtual device and the second virtual device, shutting down the second virtual device or running the second virtual device in a background process.

13. The computer program product of claim 8, wherein the at least one non-transitory computer readable medium stores further instructions translatable by the virtual mobile device platform server machine to perform:
   providing a user of the mobile device with simultaneous or substantially simultaneous access to the first virtual device and to the second virtual device.

14. A system, comprising:
   at least one processor;
   at least one non-transitory computer readable medium storing instructions translatable by the at least one processor to perform:
      establishing a first connection over a network between a mobile device and a first virtual device running on the virtual mobile device platform;
      subsequent to a triggering event, establishing a second connection between the first virtual device and a second virtual device;
      performing a session handover between the first virtual device and the second virtual device over the second connection, the session handover including context information; and
      passing data from the second virtual device to the mobile device over the network.

15. The system of claim 14, wherein the first virtual device and the second virtual device have same operating system or different operating systems.

16. The system of claim 14, wherein the at least one non-transitory computer readable medium stores further instructions translatable by the at least one processor to perform:
   terminating the second connection between the first virtual device and the second virtual device when a task associated with the triggering event is completed or per an instruction received from the mobile device.

17. The system of claim 16, wherein the at least one non-transitory computer readable medium stores further instructions translatable by the at least one processor to perform:
   prior to terminating the second connection between the first virtual device and the second virtual device, passing data from the second virtual device to the first virtual device.

18. The system of claim 14, wherein the at least one non-transitory computer readable medium stores further instructions translatable by the at least one processor to perform:
   subsequent to terminating the second connection between the first virtual device and the second virtual device, shutting down the second virtual device or running the second virtual device in a background process.

19. The system of claim 14, wherein the at least one non-transitory computer readable medium stores further instructions translatable by the at least one processor to perform:
   providing a user of the mobile device with simultaneous or substantially simultaneous access to the first virtual device and to the second virtual device.

20. The system of claim 14, wherein the virtual mobile device platform is hosted in a cloud having multiple management domains and wherein the primary virtual device and the secondary virtual device are in same management domain or different management domains in the cloud.

\* \* \* \* \*